Nov. 18, 1924.　　　　　　　　　　　1,515,625
P. M. SELLERS
SHEET GLASS MACHINE
Filed May 19, 1921　　　　4 Sheets-Sheet 1
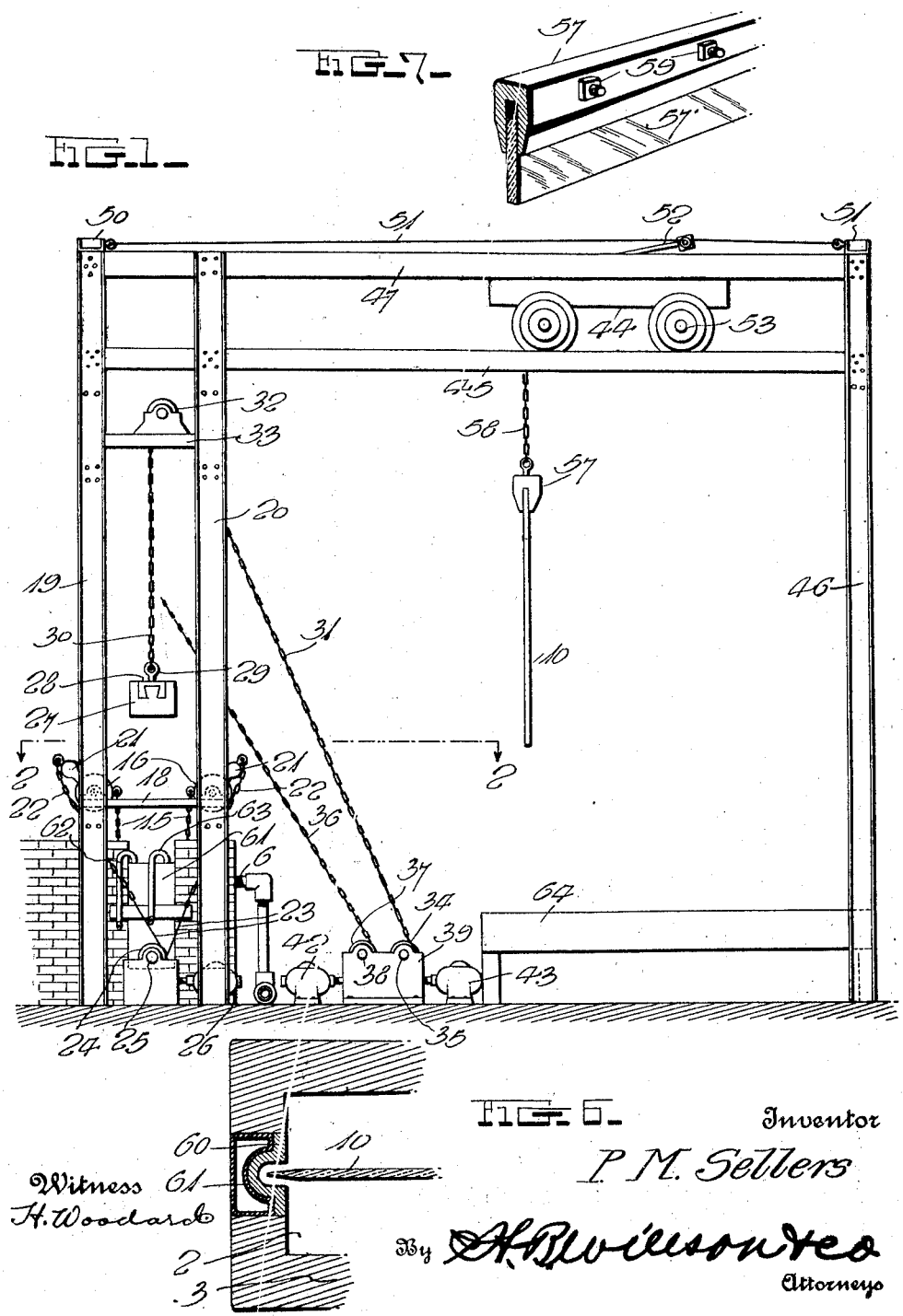
Inventor
P. M. Sellers
Witness
H. Woodard
By H. B. Wilson & Co.
Attorneys

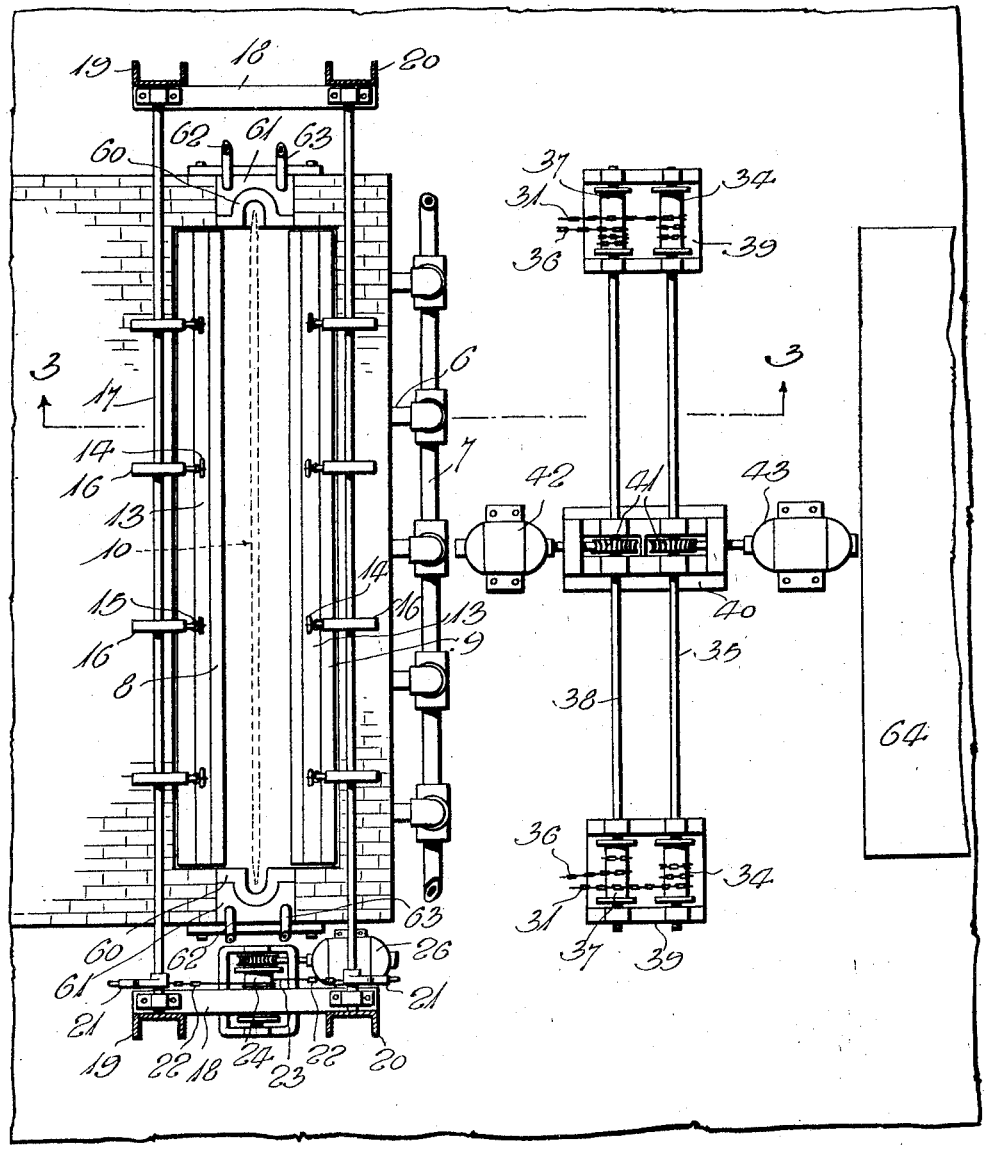

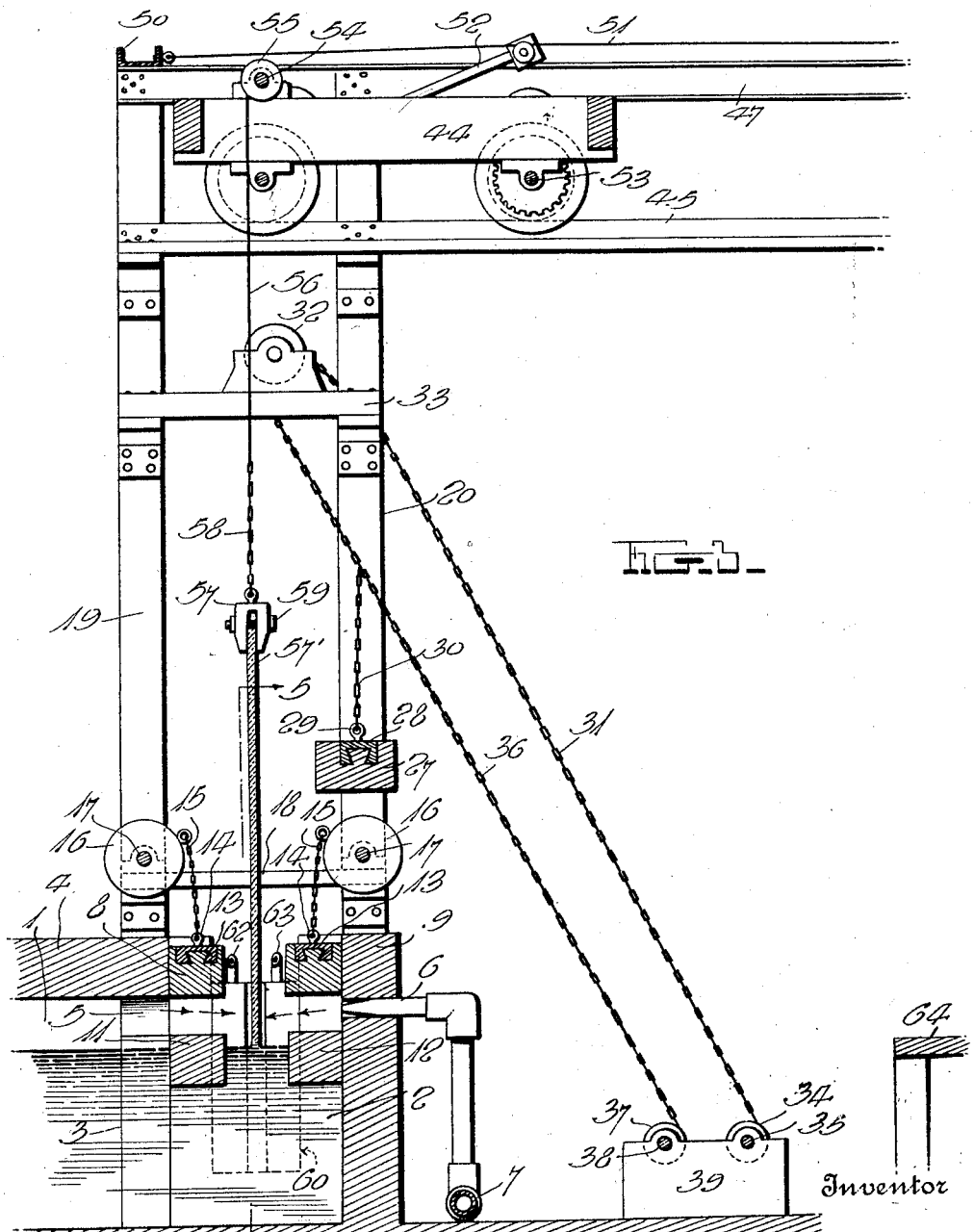

Nov. 18, 1924.
P. M. SELLERS
1,515,625
SHEET GLASS MACHINE
Filed May 19, 1921
4 Sheets-Sheet 4
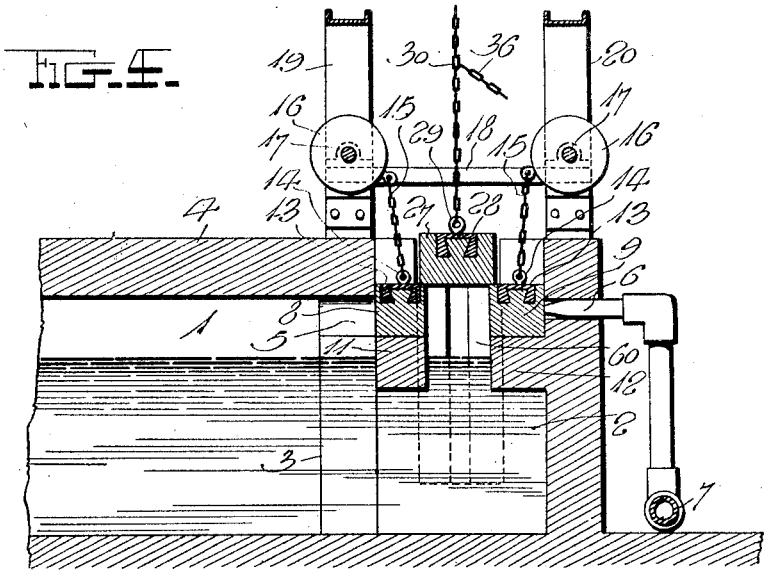
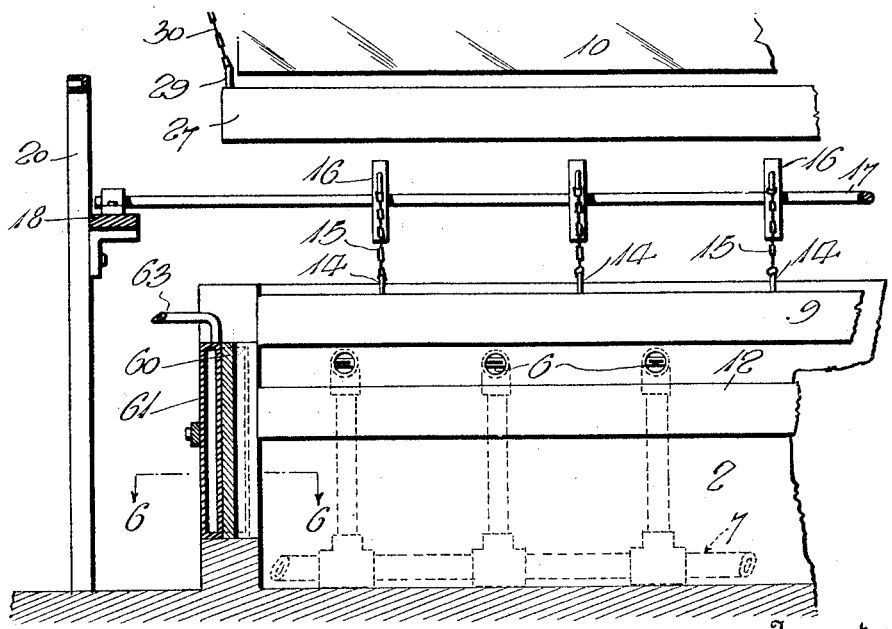
Witness
H. Woodard
Inventor
P. M. Sellers
By H. R. Wilson & Co.
Attorneys Patented Nov. 18, 1924.

1,515,625

UNITED STATES PATENT OFFICE.

PRINTISS M. SELLERS, OF MOUNT VERNON, OHIO, ASSIGNOR OF ONE-HALF TO PERRY E. LANNOY, OF MOUNT VERNON, OHIO.

SHEET-GLASS MACHINE.

Application filed May 19, 1921. Serial No. 470,863.

*To all whom it may concern:*

Be it known that I, PRINTISS M. SELLERS, a citizen of the United States, residing at Mount Vernon, in the county of Knox and State of Ohio, have invented certain new and useful Improvements in Sheet-Glass Machines; and I do declare the following to be a full, clear, and exact description of the invention, such as will enable others skilled in the art to which it appertains to make and use the same.

This invention relates to an improved machine for forming sheets of glass and one object of the invention is to provide a machine by means of which a sheet of glass may be formed by drawing the molten glass upwardly and to provide means for chilling the side edge portions of the sheet of glass thus retaining the glass the desired width and further cause the sheet of glass to be tempered while being drawn upwardly and also to cause the edge portions to be feathered.

Another object of the invention is to provide improved means for burning off the lower portion of a sheet of glass when the sheet has been drawn upwardly a sufficient distance.

Another object of the invention is to provide an improved type of fire pot having an auxiliary chamber from which the glass forming the sheet will be drawn and to provide improved valve means for cutting off heat while the sheet of glass is being drawn upwardly.

Another object of the invention is to provide improved controlling valves and an improved cover for the auxiliary chamber and to also provide improved operating means for the valves and cover so that the valves and cover may be moved upwardly when desired.

Another object of the invention is to provide improved glass lifting means including a clamp for carrying a strip of glass forming a base which will be let down into the melted glass and then carried upwardly to draw the glass upwardly in the form of a sheet.

Another object of the invention is to so construct this machine that the glass raising mechanism may include a carriage mounted on a track and movable from a position above the fire pot to a position above a table thus permitting the sheet of glass to be deposited upon the table and then cut into the proper sizes.

Another object of the invention is to so construct this machine that the plate of glass may be formed without danger of warping and to further so construct this machine that a single plate of glass may be formed at one time and drawn upwardly and then cut from the melted glass in the fire pot and carried to the cutting table by the same device which serves to draw the glass upwardly from the fire pot.

This invention is illustrated in the accompanying drawings, wherein:

Figure 1 is a view showing the improved machine in elevation.

Figure 2 is a transverse sectional view taken along the line 2—2 of Fig. 1.

Figure 3 is an enlarged vertical sectional view taken along the line 3—3 of Fig. 2.

Figure 4 is a transverse sectional view through the fire pot with the valve bars and cover in a closed position.

Figure 5 is a sectional view taken along the line 5—5 of Fig. 3 with the sheet of glass shown cut off and in a raised position above the cover.

Figure 6 is an enlarged sectional view taken along the line 6—6 of Fig. 5.

Fig. 7 is a perspective view showing a fragment of the bait holding clamp and bait carried thereby.

This improved machine is provided with a fire pot 1 having an auxiliary chamber 2 formed by providing a partition or wall 3 which is provided with archways 5 for permitting molten glass and heat to pass into the auxiliary chamber. The outer wall of the chamber 2 is provided with openings to receive nozzles 6 which communicate with a conduit 7 leading to a suitable fuel supply. Therefore, when the valve bars 8 and 9 are in the raised position, heat may pass from the fire pot into the auxiliary chamber upon one side of a sheet of glass and flame from the nozzles or burners 6 may pass into the auxiliary chamber upon the opposite side of the sheet of glass. This application of heat to the lower end portion of the glass will burn the glass through and thus leave the sheet of glass 10 free to be carried upwardly. Within the auxiliary chamber 2 there has been provided bolsters 11 and 12 which are positioned beneath the valve bars 8 and 9 to support the valve bars when lowered. The fire pot and the supports 11 and 12 will be formed of suitable fire brick and the valve bars 8 and 9 are also formed of fire brick or fire clay and provided with longitudinally extending undercut seats in their upper portions to receive the channel bars 13. These channel bars are provided with eyes 14 from which extend chains 15 connected with the eyes of the disks 16 mounted upon the rotatably mounted shafts 17. The shafts 17 are mounted in bearings carried by the cross bars 18 which extend from the standards 19 to the standards 20 and each shaft is provided with a rocker arm 21 having a chain 22 connected therewith and engaged by a cable 23 wound upon a drum 24. This drum 24 is mounted upon the shaft 25 which is suitably connected with the shaft of the motor 26 so that when the motor is in operation, the shaft 25 may be rotated and the levers drawn upon to rotate the shafts 17 and thus draw the valve bars upwardly from the position shown in Fig. 4 to the position shown in Fig. 3. The cover bar 27 is constructed similar to the valve bars and provided with a channel bar 28 similar to the bars 13. An eye 29 is provided at each end of this channel bar 28 and engaged by the extensions 30 of chains 31. The chains pass over pulleys 32 which are carried by supporting brackets 33 near the upper end of the standards 19 and 20 and these chains 31 are wound upon the drum 34 of the shaft 35. Chains 36 are connected with the chains 31 in spaced relation to the eyes 29 thus providing the extensions 30 for the chains 31. These chains 36 are wound upon the drums 37 of the shafts 38. The shafts 35 and 38 are rotatably mounted in boxes 39 and 40 and carry worm gears 41 so that the shafts 35 and 38 may be independently rotated through the medium of motors 42 and 43. It will thus be seen that when it is desired to draw cover bar 27 upwardly from a position resting upon the valve bars as shown in Fig. 4, the motors may be operated to rotate the two shafts, the shafts 35 being rotated to draw upon the chains 31 and draw the cover bar upwardly and the shaft 38 being permitted to rotate for unwinding of the chains 36. After reaching the position shown, it is then desired to have the cover bar drawn out of the way to the position shown in Fig. 3 and the shaft 38 will then be rotated to draw upon the chain 36 and draw the cover bar over to the position of Fig. 3.

A carriage 44 is mounted upon track bars 45 which are secured to the standards 19 and 20 and to the standards 46. These standards are braced at their upper ends by bars 47 which extend above the track bars 45 and cross bars 50 and 51 connect the standards 19 and standards 46 respectively. These cross bars carry trolley wires 51 engaged by the trolley pole 52 by means of which power is supplied to the motors which will be provided for imparting rotary movement to the driving axle 53 and shaft 54 upon which will be mounted drums 55. When the shaft 54 rotates to wind the cable 56 upon the drums 55, the clamp bar 57 which is connected with the cables by means of chains 58 will be drawn upwardly. This clamping bar 57 is to carry a strip of glass 57′ which forms the base, tightening bolts 59 being provided so that the clamp may be drawn into tight binding engagement with the strip of glass.

When this device is in use, the strip of glass 57′ is clamped between the jaws of the clamp 57 by tightening bolts 59 and the cover is then swung upwardly and to one side to the position shown in Fig. 3, the valve bars however being left in the closed position of Fig. 4. The clamping strip or bar 57 is then lowered so that the strip of glass 57′ extends down into the molten glass of the auxiliary chamber 2 thus causing the glass in the chamber 2 to melt the lower portion of the strip 57′. The clamping strip is then drawn upwardly and as it does so, melted glass from the auxiliary chamber is drawn upwardly with the strip 57′. This strip 58 is of such length that its end portions fit into the U-shaped facing blocks 60 provided for the cooling chambers 61 or boxes at the ends of the auxiliary chamber. These cooling chambers are cooled by water which will pass into the cooling chambers through pipes 62 and out of the cooling chambers through pipes 63. It will thus be seen that as the glass is drawn upwardly, the side edge portions which extend into the blocks as shown in Fig. 2 will be cooled and caused to assume a taper which will provide a feather edge for the sheet of glass. The glass will thus be cut the proper width and will be tempered as it is drawn upwardly. By having a tapered or feathered edge formed, a bead or thickened portion is prevented from forming at the edges of the sheet of glass and thus a great deal of glass is saved due to the fact that it is not necessary to cut off the edge portion in order to provide a sheet having a flat edge portion. When the sheet of glass has been formed by drawing the clamping strip or bar upwardly the desired height, the valve bars will be raised as shown in Fig. 3 and heat from the main fire pot will strike the pane of glass upon one face thereof and flame from the burners 6 will strike the pane of glass upon the opposite face. This will cause the pane of glass to be melted or in other words cut through at its lower end and the sheet of glass can be raised upwardly to a position above the cover bar. The valve bars can then be lowered to a closed position and the cover bar returned to the closed position thus retaining heat in the auxiliary chamber and preserving the glass therein in a melted state. As soon as the sheet of glass has been drawn upwardly a sufficient distance to permit of its passing between the standards 20, the carriage will be caused to move along the track bars 45 by means of the motor which drives the axle 53. The sheet of glass can then be lowered so that its lower edge will rest upon the table 64 and can then be lowered to rest flat upon the table. After the sheet of glass has been placed flat upon the table, the clamp will be loosened and will then be carried upwardly and the carriage returned to the position above the auxiliary chamber of the fire pot, so that a new strip of glass may be clamped between the jaws of the clamp and the strip of glass lowered to extend into the auxiliary chamber which will be opened and a new sheet of glass drawn out of the auxiliary chamber. It will thus be seen that there has been provided a machine by means of which large sheets of glass may be formed one at a time with the side edge portions cooled and thus tempered to retain the sheet of glass the desired width and prevent warping. It will be further noted that there has been provided a machine in which the sheet of glass may be cut off at the bottom by application of heat upon opposite side faces thereof and the sheet of glass then carried over and deposited upon a table where it will be cut into smaller pieces.

I claim:

1. In a sheet glass making machine, a fire pot comprising a chamber for receiving melted glass, means for drawing glass out of said chamber in a sheet, and means for chilling the side edge portions of the sheet of glass to provide feathered edges while being drawn out of the chamber, said means consisting of blocks positioned in the walls of the fire pot at the ends of the chamber and U-shaped in top plan to provide channels receiving the side portions of the sheet of glass and causing chilling of the edge portions of the sheet of glass from opposite faces, and cooling means for said blocks.

2. The structure of claim 1 having the cooling means in the form of water boxes fitting against the blocks and each having a water inlet and a water outlet.

3. In a sheet glass making machine, a fire pot comprising a main chamber and an auxiliary chamber open at its upper end and having communication with the main chamber above and below the normal glass level, the outer wall of the auxiliary chamber having burner receiving openings above the normal glass level, spaced valve bar supports in the auxiliary chamber, valve bars removably resting upon said supports for closing the openings of the outer wall and shutting off communication with the main chamber above the glass level, a removable cover for closing the open upper end of the auxiliary chamber, and means for drawing a sheet of glass out of the auxiliary chamber between the valve bars and supports with the cover removed.

4. In a sheet glass making machine, a fire pot comprising a main chamber and an auxiliary chamber open at its upper end and communicating with the main chamber above the normal glass level, means for drawing a sheet of glass upwardly through the open upper end of said auxiliary chamber, means for directing a heat blast across the auxiliary chamber towards the main chamber above the normal glass level, and removing the lower portion of a sheet of glass being drawn out of the auxiliary chamber, means for shutting off communication between the auxiliary chamber and main chamber above the glass level, control means for the heat blast to prevent passage of the heat blast across the auxiliary chamber and a removable cover for closing the open upper end of the auxiliary chamber.

5. In a sheet glass making machine, a fire pot including an auxiliary chamber having an open upper end and communicating with the main body of the fire pot above the normal glass level, burner nozzles extending through the outer wall of the auxiliary chamber, supports positioned upon opposite sides of the auxiliary chamber, valve bars resting upon the supports for shutting the nozzle receiving opening of the outer wall and shutting off communication of the auxiliary chamber with the main body of the fire pot above the glass level, a cover bar resting upon the valve bars and closing the space between the same, means for swinging the cover and valve bars upwardly to an open position, and means for drawing a sheet of glass out of the auxiliary chamber with the cover bar raised and the valve bars in an operative position, the valve bars when raised admitting heat upon opposite sides of a sheet of glass to sever the sheet from the body of melted glass in the auxiliary chamber.

6. A sheet glass forming machine comprising a fire pot, a frame above said fire pot, tracks carried by said frame, a carriage upon said tracks, a table in front of said fire pot beneath the tracks, a rotatable drum shaft carried by the carriage, a clamp bar for holding a strip of glass dipped into the fire pot preparatory to drawing a sheet of glass out of the same and cables connected with the clamp and wound upwardly to raise the clamp when the drum shaft is rotated, the carriage being moved to deposit the sheet of glass upon the table after being drawn out of the fire pot and cut off.

In testimony whereof I have hereunto set my hand in the presence of two subscribing witnesses.

PRINTISS M. SELLERS.

Witnesses:
BENTON W. PERKINS,
JOSEPH H. LEVISON.